United States Patent Office 3,576,673
Patented Apr. 27, 1971

3,576,673
METHOD FOR PAINT STRIPPING
Harry R. Charles, Troy, and Roy Trudell, Pontiac, Mich., assignors to Chemfil Miles Chemical & Filter Company, Inc., Troy, Mich.
No Drawing. Continuation-in-part of application Ser. No. 686,721, Nov. 29, 1967. This application May 7, 1970, Ser. No. 35,555
Int. Cl. C09d 9/04; C23g 1/14
U.S. Cl. 134—38          1 Claim

ABSTRACT OF THE DISCLOSURE

A method for paint stripping employing a hot water bath and a liquid concentrate generally including sodium hydroxide, an accelerator, and a co-solvent.

CROSS REFERENCE

This application is a continuation-in-part of our prior application, Ser. No. 686,721 of Nov. 29, 1967, which will be abandoned subsequent to the filing of the present application.

BACKGROUND OF THE INVENTION

The patent to Gravell, 1,744,463, of Jan. 21, 1930, discloses a paint stripping process, representative of the art in which the present invention may be found.

The process of that patent employs a hot water bath containing sodium hydroxide and an accelerator. The specific accelerator of the process of that patent is cresylic acid. In recent years, legistration universally adopted, has forbidden the use of that process because of the pollution and disposal problems incident to the use of cresylic acid.

Hence, it is one objject of the present invention to provide a process not employing cresylic acid as an accelerator.

KNOWN PRACTICES

Paint strippers, as presently commonly packaged and sold, may be classified as follows:

(A) Solvent based cold strippers

This type is expensive and is objectionable in that it usually produces toxic fumes when used.

(B) Hot caustic strippers, employing sodium hydroxide (B1) Caustic type paint strippers are often sold in dry or powdered form with a suitable accelerator included as an additive. This type is dangerous to use because of the heat of solution that occurs when the product is introduced into a water bath (Gravell, 1,744,463, col. 1, lines 30–35).

(B2) Liquid solutions of caustic, which are supplied in liquid form and with which also are supplied separate packages of accelerators. This type is inconvenient to use and expensive. Two packages are involved. While this practice seems to be safe because the heat of solution has already been dissipated during manufacture of the solution, there still exists the inconvenience as well as added expense involved in obtaining two separate packages, one for the caustic solution and the other for the accelerator.

It, of course, is understood that what we are dealing with here specifically is a process which is effective for paint stripping and which includes, as a requirement, a suitable accelerator.

THE OBJECTIVE

Our objective is to produce a method wherein is employed a single pre-mixed liquid concentrate package, which is supplied as a single liquid form package, which is safe to use, which produces no appreciable heat of solution when used, and is economical, as compared with the two package method described above, and which is as efficient in use and performs as effectively as any of the methods now in use.

We accomplish this objective as follows, in general. Into a hot water bath, we introduce a concentrate, a premixture in liquid form, made up generally as follows:

(1) A water solution of caustic soda.
(2) An accelerator which performs effectively; but the known effective and acceptable accelerators happen not to be soluble in the caustic solution.
(3) A solvent into which the accelerator may be dissolved to form a solution which itself may be dissolved in the caustic solution.

In general, the concentrate is formed as follows: a water solution of caustic is formed, and a solution of the solvent and accelerator is formed. Then the solvent-accelerator solution and the caustic solution are mixed to form the concentrate.

PROPORTIONS AND VARIATIONS (1) The caustic

There may be used sodium hydroxide or potassium hydroxide. The sodium hydroxide is preferred because of considerations of cost.

Range.—About 50% caustic soda and about 50% water are used. It is preferable to use about 47% of the caustic, but this is only because of freezing point considerations. The exact percentage is not critical.

(2) The solvent

Suitable solvents we have found are generally of the water soluble, low-carbon chain type. Examples are methyl alcohol, sometimes known as methanol, ethyl alcohol, isopropyl alcohol, and a variety of mixtures of these alcohols.

It is required that the solvent effectively dissolve the accelerator and that the solvent-accelerator solution itself be soluble in the water solution of caustic. The function of the solvent is simply to dissolve the accelerator and enable the solution thus formed to be dissolved in the caustic solution.

Range.—Between about 5–15% of solvent is used in the total product. In a preferred example, 8% has been used. The exact percentage is not critical.

(3) The accelerator

This could be any one of a variety of widely known accelerators, and known to speed up and act upon the caustic for paint stripping. These are well known and are selected as desired, consideration being given to the nature of the paint to be stripped and the effect of the accelerators on the caustic. The choice of the accelerator is dictated mostly by the nature of the paint to be stripped and also by municipal ordinances regarding disposal of the stripped paint. The cresylic acid of Gravell, 1,744,463, is no longer permitted by municipal ordinances in many places because of the effect of cresylic acid and paint disposal upon microorganisms and the like.

Generally, the known accelerators may be found to be of the hydroxyl type, including a hydroxide radical.

Phenolics of the oil soluble type, pentachlorophenol or hexachlorophenol, are suitable for acrylic lacquer-based paints, and can be used alone or in combination with each other or in combination with other accelerators. They can be combined as desired with various glycols also commonly known and used as accelerators for caustic in paint stripping.

Among others, there are four paints commonly used. The paint to be stripped is given great consideration in choosing the specific accelerator. These paints may roughly be described as baked acrylic lacquers, unbaked acrylic lacquers, baked enamels, and unbaked enamels. The accelerators commonly used include glycols and phenols and mixtures of both. The selection is dictated by the knowledge of those skilled in the art.

Range.—There is not criticality to the proportions of accelerator being used. The proportions can vary greatly from a low ratio of glycol to phenol to a very high ratio. In some cases, no phenol need be used. Ordinarily, proportions are selected as desired and ordinarily, at least some glycol and at least some phenol are used.

Manufacturing examples.—The concentrate has been mixed, in known instances, in a mixture tank of approximately 4,000 gallon capacity and was packaged in 55 gallon drums, about 600 pounds of liquid paint stripper concentrate.

EXAMPLE 1

This is identified by our code name Polystrip L78. It has successfully been used on baked lacquers and enamels. The solvent was about 670 gallons of methanol, methyl alcohol. One of the accelerators was pentachlorophenol, sold under the trade name of Dowicide, in the amount of 1750 pounds. The other accelerator was 220 gallons of hexylene glycol. 32,000 pounds of 50% liquid caustic soda solution was used. 260 gallons of hot water, about 180° F. or so, in non-critical amounts or temperatures, was used to dilute the caustic solution from 50% down to 47% which we preferred.

EXAMPLE 2

This is known under our code name Liquid Gratestrip and is used on unbaked paints. The formulation was generally as above, except that 300 pounds of lignosulfonate, purchased under the trade name of Orzon, was used as an accelerator instead of the pentachlorophenol of the previous example.

Customer's use

The customer would add about 600 pounds more or less of the concentrate, as he desired, to a tank of hot water at about 180° F., in concentrate to water ratios varying from 2-100 to as high as 30-100, depending upon the speed of action desired by the customer, the quantity of parts to be cleaned, and other non-critical operating factors, all as well known in the paint stripping art. Since the ratio of concentrate to the hot water of the bath is fairly low, and the temperature of the bath was quite moderate as specified, expenses of operation were reduced and other advantageous factors were obtained.

The hot water-caustic soda-accelerator process hereof is not to be compared or contrasted with other paint stripping processes such as those which operate at extremely high temperatures, such as 700-1000° F., or those which operate at room temperatures, or those which operate with very high amounts of stripper content in the stripper bath.

The process

The operating temperature was about 180° F. The concentrate to water ratio ranged from between about 2% to about 30%. The time is as desired. The time could be speeded up to as little as 30 minutes immersion by an increase of the ratio of concentrate to water in the bath, or it could be slowed down to 10 hours or so by a decrease of the ratio, all as desired.

The process has an inherent degree of flexibility, and permits paint stripping whether the parts are in batches or are passed through the bath on conveyors, singly or in groups.

At the time that this product was introduced to the market there was not known any single liquid pre-mixed paint stripper concentrate of the effectively accelerated type, useful in a water bath at about 180° F.

The then-known strippers which operate at 180° F. required either expensive solvents or were inconvenient or dangerous to use because they required mixing by the customer at the point of use; or else were of the non-accelerated type which have been found to be erratic and which have often been found to be ineffective for successfully and effectively stripping certain types of paints.

CONCLUSION

There has here been disclosed a paint stripping process, the details of which have been furnished above by way of example. We now point out and distinctly claim our process to be as follows:

1. The method of stripping paints from metallic articles, wherein, said paints are of the class of commonly used baked or unbaked acrylic lacquers and enamels; said method comprising the step of immersing the painted metallic articles in a water bath at about 180° F.;

said water bath having had introduced therein about 3-30 lbs. of previously mixed liquid concentrate per 100 lbs. water;

said previously mixed liquid concentrate consisting essentially of the following ingredients in approximately the following proportions by weight:

(a) about 75-87% of about 47% water solution of sodium hydroxide;

(b) about 8-10% of one or more accelerators, one of which may be selected from the group consisting of hexylene glycol pentachlorophenol, and hexachlorophenol;

(c) and about 5-15% solvent for whichever of the accelerators is used, with said solvent, while the accelerators are dissolved therein, being itself soluble in the water solution of sodium hydroxide;

the solvent being selected from the group of water-soluble low-carbon chain alcohol consisting of alcohol, ethyl alcohol, isopropyl alcohol;

and with the parts being immersed in the bath for so long as needed to effectuate the desired paint stripping.

References Cited

UNITED STATES PATENTS

| | | | |
|---|---|---|---|
| 1,744,463 | 1/1930 | Gravell | 252—156 |
| 2,564,129 | 8/1951 | Rotelli | 134—28 |
| 2,755,209 | 3/1953 | Duncan | 252—158 |
| 2,901,439 | 8/1959 | Burke | 252—389 |
| 3,058,918 | 10/1962 | Gatza | 252—139 |
| 3,179,609 | 4/1965 | Morison | 134—38X |
| 3,417,025 | 12/1968 | Cooper et al. | 252—156X |

LEON D. ROSDOL, Primary Examiner

A. I. RADY, Assistant Examiner

U.S. Cl. X.R.

252—158

UNITED STATES PATENT OFFICE
CERTIFICATE OF CORRECTION

Patent No. 3,576,673　　　　　　　　　Dated　　April 27, 1971

Inventor(s) Harry R. Charles and Roy Trudell

It is certified that error appears in the above-identified patent and that said Letters Patent are hereby corrected as shown below:

Column 1, line 36, cancel "objject" and substitute - -object- -.

Column 3, line 12, cancel "mixture" and substitute - -mixing- -.

Column 4, line 37, after "glycol" insert - -,- -;

Line 45, cancel "alcohol" and substitute - -alcohols- -;

Line 46, after "of" insert - -methyl- -.

Signed and Sealed this

Thirteenth Day of March

[SEAL]

Attest:

Attesting Officer

GERALD J. MOSSINGHOFF

Commissioner of Patents and Trademar